Aug. 15, 1939.   O. LJUNGSTROM   2,169,652
INTERNAL COMBUSTION ENGINE
Filed Dec. 20, 1937
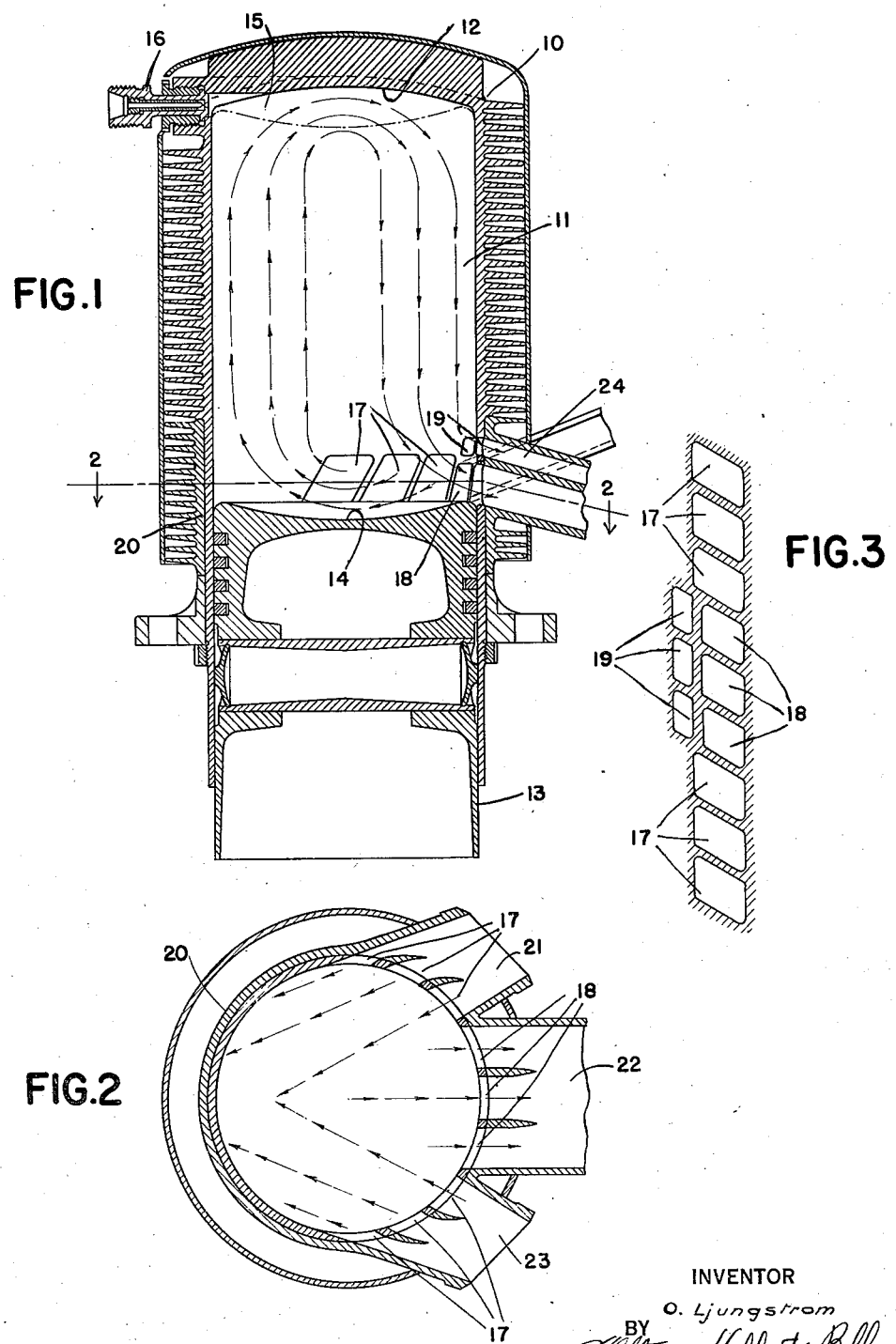
INVENTOR
O. Ljungstrom
BY
ATTORNEYS Patented Aug. 15, 1939

2,169,652

UNITED STATES PATENT OFFICE 2,169,652

INTERNAL COMBUSTION ENGINE

Olof Ljungstrom, Detroit, Mich.

Application December 20, 1937, Serial No. 180,862

9 Claims. (Cl. 123—65)

This invention relates generally to internal combustion engines and refers more particularly to two-cycle engines having high speed operation.

It is one of the principal objects of the present invention to improve generally engines operating on the two-cycle principle by providing more complete combustion in a shorter interval of time and thereby rendering it possible to efficiently operate such engines at a higher speed.

Owing to the fact that the solution of the problem of securing efficient high speed operation of a two-cycle engine operating on the Diesel or compression ignition principle is in certain respects more complicated than in spark ignition engines, I have selected the former for the purpose of illustrating this invention, although it is to be understood that many of the features of the invention may be advantageously employed in spark ignition engines.

In a true Diesel engine, combustion takes place at a substantially constant pressure, as evidenced by the fact that the air admitted in the cylinder is compressed during the upstroke of the piston to approximately the maximum cylinder pressure, and the heat resulting from this compression of the air increases the temperature of the air from substantially atmospheric temperature to a temperature sufficiently high to ignite the fuel as it is injected into the cylinder through a suitable nozzle. For smooth high speed operation, the fuel should burn as fast as it enters the cylinder and any appreciable rise in pressure above the compression pressure should be controlled by injecting only enough fuel to prevent a pressure drop.

Combustion or oxidation may be explained as a chemical reaction which takes place when the oxygen atoms of the air combine with both the carbon and hydrogen atoms of the fuel at a certain temperature. The temperature produced by the heat of compression is sufficiently high for instantaneous oxidation or combustion, providing the carbon and hydrogen atoms come in contact with the proper number of oxygen atoms.

With the above in mind, it is one of the features of this invention to insure contact of the carbon and hydrogen atoms with the proper number of oxygen atoms by effecting an orderly circulation of air in the cylinder during combustion. In accordance with the present invention, air enters the cylinder during the scavenging operation and is guided in a circular path by the piston head, cylinder wall opposite the air intake passage, and the cylinder head. When the piston has closed the ports in the cylinder wall, the rotary motion of the air in the cylinder conforms theoretically to $I \times W =$ constant, so that when the piston moves upwardly and the inertia I decreases, the angular velocity W increases. The fuel is injected into the rotary air stream and is immediately oxidized or burned. The residue resulting from combustion is rapidly carried away by the movement of the air stream which is desirable in that it permits fresh air and new gases to immediately enter the space evacuated by the residue. Also, by rotating the air in an orderly manner in the cylinder, it is necessary to only penetrate the fuel halfway across the cylinder in order to bring all of the air in contact with the fuel. The reduction of the fuel penetration in the cylinder renders it possible to more completely atomize the fuel and thereby decrease the time of gasification and ignition. In other words, the above construction provides for obtaining greater engine speeds and at the same time insures better performance of the engine.

A further advantageous feature of the present invention consists in the provision of a two-cycle internal combustion engine wherein the piston controlled intake and exhaust ports are at the same elevation in the cylinder wall. This feature is of importance in that it provides for obtaining a longer effective stroke of the piston with the minimum length of cylinder.

In addition to the foregoing, the present invention contemplates utilizing the pressure of the exhaust gases discharged from the cylinder to perform useful work which may include assisting in driving the crankshaft of the engine and in driving the blower for supplying the scavenging air to the cylinder. In the present instance, the above is accomplished by arranging a pre-exhaust port in the cylinder wall in such a position that this port is opened by the piston slightly in advance of the other ports, with the result that the exhaust gases pass out of the cylinder at a relatively high pressure and velocity. Another feature is realized by virtue of the above arrangement, since the inertia of the exhaust gases passing through the pre-exhaust actually effects a pressure in the cylinder which is below atmospheric, and this is desirable in that it tends to increase the velocity of the scavenging air which is admitted through the intake ports in the cylinder.

The foregoing, as well as other objects, will be made more apparent as this description proceeds, especially when considered in connection with the accompanying drawing, wherein:—

Figure 1 is a vertical sectional view through a cylinder and piston of a two-cycle engine constructed in accordance with this invention;

Figure 2 is a cross sectional view taken substantially on the plane indicated by the line 2—2 of Figure 1; and Figure 3 is a development view of a portion of the cylinder illustrating the scavenging final exhaust and pre-exhaust ports.

Referring now more in detail to the drawing, it will be noted that there is illustrated in Figure 1 a single cylinder assembly for an internal combustion engine operating on the two-cycle principle and preferably of the fuel injection Diesel type wherein combustion is effected at a substantially constant pressure. In Figure 1 of the drawing, the reference character 10 designates a cylinder having a bore 11 closed at the upper end by means of an upwardly bowed wall or head portion 12 forming a section of a sphere. A piston 13 is reciprocably mounted in the bore 11, and the head 14 of the piston is depressed to cooperate with the head 12 of the cylinder in the uppermost position of the piston to define a combustion space 15 of predetermined volume. In the present instance, fuel is injected into the space 15 by means of a nozzle 16 secured in the side wall of the cylinder and adapted to discharge a sheet of fuel into the cylinder at right angles to the vertical axis of the bore. The detailed construction of the nozzle 16 and the manner in which it discharges the fuel into the cylinder is defined in my copending application Serial No. 164,822, filed September 20, 1937.

The piston 14, in addition to performing its usual function of compressing the charge, also controls the intake scavenging air ports 17, the final or main exhaust ports 18, and the pre-exhaust ports 19. The aforesaid ports are formed in the side wall of the cylinder opposite the injector nozzle and adjacent the lower end of the cylinder. Upon reference to Figure 3, it will be noted that the series of final or main exhaust ports 18 are located between the two series of intake scavenging air ports 17 and at the same elevation as the latter ports. The pre-exhaust ports 19 are formed in the side wall of the cylinder directly above the main or final exhaust ports 18 and have a cross sectional area relatively small, as compared to the area of the main exhaust ports. As a result of the above, the minimum extent of the cylinder wall axially of the bore is ported, and this is advantageous in that it provides for obtaining a longer effective stroke of the piston with the minimum length of cylinder bore.

Upon reference to Figures 1 and 2, it will be noted that a collar 20 encircles the ported portion of the cylinder, and is provided with individual passages 21, 22, 23, and 24. The passages 21 and 23, respectively, communicate with the two series of ports 17 for the scavenging air, while the passage 22 communicates with the series of main or final exhaust ports 18, and the passage 24 communicates with the pre-exhaust ports 19.

While reference has been made above to the fact that the ports 17 and 18 are formed in the cylinder wall at the same elevation, nevertheless, it will be noted from Figure 3 that the ports 17 extend slightly above the upper ends of the main exhaust ports 18. With this construction, it will be noted that when the piston descends within the cylinder bore, the scavenging intake air ports 17 are opened by the piston, prior to opening of the main exhaust ports 18. As a result, scavenging air is introduced into the cylinder from the blower, or other source of supply, just prior to opening of the exhaust, and this is desirable in that it expedites the discharge of the residue in the cylinder bore.

The scavenging air discharged under pressure through the ports 17 is guided by the head 14 of the piston, the wall of the cylinder directly opposite the ports, and the cylinder head 12 in a rotary path, designated in Figure 1 by the arrows. The residue in the cylinder bore is forced ahead of the air through both the main and pre-exhaust ports 18 and 19, respectively. However, after the piston has been moved upwardly sufficiently to close all of the ports, the rotary motion of the air conforms theoretically to $I \times W =$ constant, where I represents the inertia of the air and W, the velocity of the air. As a consequence, as the piston approaches its uppermost position in the cylinder bore, the inertia I decreases, and the velocity W increases. The fuel is, of course, injected into the air stream circulating in the cylinder bore in timed relation to upward movement of the piston, and this fuel is immediately oxidized. The residue, or the products resulting from combustion of the fuel, are instantaneously carried away from the region adjacent the fuel injector nozzle by the circulating air, and the space evacuated thereby is immediately filled with fresh air and unburned fuel. This feature contributes materially to securing complete combustion in the minimum time and thereby provides for increasing the speed of operation of the engine. It will also be observed from Figure 1 that with the above arrangement, penetration of the fuel halfway across the cylinder is sufficient to bring all of the circulating air in contact with the fuel. By shortening the extent of penetration of the fuel in the cylinder, the time of gasification and ignition is correspondingly reduced, with the result that the speed of the engine may be appreciably increased.

When the piston descends in the cylinder bore, the pre-exhaust ports 19 are opened before any of the other ports and, due to the relatively small cross sectional area of the pre-exhaust ports and the high pressure of the exhaust, the latter will be discharged through the passage 24 at a rapid rate. As a matter of fact, the velocity of the gases discharged from the passage 24 is sufficiently high so that the latter may be effectively used in driving the blower for the scavenging air and also may be used to assist in driving the crankshaft (not shown) of the engine. Due to the high velocity and inertia of the exhaust gases flowing through the pre-exhaust ports 19 from the cylinder, a pressure slightly below atmospheric exists in the cylinder when the scavenging intake air ports 17 are opened by the piston. This characteristic is desirable in that it provides for appreciably increasing the velocity of the scavenging air.

What I claim as my invention is:

1. In an internal combustion engine, a cylinder having scavenging and exhaust ports spaced from each other circumferentially of the cylinder with the circumferentially spaced side walls arranged in overlapping relationship, a piston in the cylinder controlling said ports, and an additional port in the cylinder controlled by the piston and positioned to open immediately in advance of the aforesaid ports.

2. In an internal combustion engine, a cylinder having scavenging and exhaust ports spaced from each other circumferentially of the cylinder and grouped in a portion of the side wall of the cylinder located at one side of a vertical plane passing through the axis of the cylinder with the exhaust ports substantially confined in the axial space defined by lines extending circumferentially of the cylinder and including the end walls of the scavenging ports, a piston in said cylinder controlling said ports, and an additional exhaust port in the cylinder controlled by the piston and positioned to open immediately in advance of the exhaust ports.

3. In an internal combustion engine, a cylinder having scavenging and exhaust ports arranged in juxtaposition to each other circumferentially of the cylinder with the side walls thereof in overlapping relationship, a piston controlling said ports, and the end of the scavenging port adjacent the head of the cylinder extending beyond the corresponding end of the exhaust port toward the head of the cylinder to open immediately in advance of the exhaust port.

4. In an internal combustion engine, a cylinder having an exhaust port and having scavenging ports positioned on opposite sides of the exhaust port with the side walls thereof overlapping the adjacent side walls of said exhaust port, a piston controlling said ports, and a pre-exhaust port also controlled by the piston and located to open immediately in advance of the aforesaid ports.

5. In an internal combustion engine, a cylinder having an end wall and having scavenging and exhaust ports arranged side by side circumferentially of the cylinder, a piston in the cylinder controlling the ports and having a head, said head and end wall of the cylinder being shaped to direct air entering into the cylinder through the scavenging ports in a substantially circular path, and a pre-exhaust port also controlled by the piston and positioned in the cylinder to open immediately in advance of the exhaust ports.

6. In an internal combustion engine, a cylinder having an end wall and having scavenging and exhaust ports in the side wall of the cylinder with the scavenging ports adapted to open immediately in advance of the exhaust ports, a piston in the cylinder controlling the ports and having a head, said head and end wall of the cylinder being shaped to direct the air entering the cylinder through the scavenging ports in a substantially circular path, a pre-exhaust port also controlled by the piston and positioned in the cylinder to open immediately in advance of said exhaust ports and means for injecting fuel into the air stream.

7. In an internal combustion engine, a cylinder having scavenging and exhaust ports formed in the wall of the cylinder in circumferential spaced relationship and confined to the portion of the side wall of the cylinder located at one side of the vertical axis of the cylinder, a piston in the cylinder controlling said ports and having a head shaped to direct the air entering the cylinder through the scavenging ports in a substantially circular path, and an additional port in the cylinder wall at the same side of the vertical axis as the aforesaid ports and so located with respect to the above named ports to be opened by the piston immediately in advance of the exhaust ports.

8. In an internal combustion engine, a cylinder having scavenging and exhaust ports arranged side by side circumferentially of the cylinder with the scavenging ports adapted to open immediately in advance of the exhaust ports, a piston controlling said ports, and a pre-exhaust port also controlled by the piston and located to open immediately in advance of the exhaust and scavenging ports aforesaid.

9. In an internal combustion engine, a cylinder having scavenging and exhaust ports arranged side by side circumferentially of the cylinder, a head closing one end of the cylinder, a piston reciprocably mounted in the cylinder and controlling said ports, the end of the scavenging port adjacent the head of the cylinder extending beyond the corresponding end of the exhaust port in a direction toward the head of the cylinder to open immediately in advance of the exhaust port, and said head and end wall of the cylinder being shaped to direct air entering the cylinder through the scavenging port in a substantially circular path.

OLOF LJUNGSTROM.